United States Patent [19]

Okawa et al.

[11] Patent Number: 4,525,799
[45] Date of Patent: Jun. 25, 1985

[54] ELECTRONIC CASH REGISTER

[75] Inventors: Tamotsu Okawa, Nagaokakyo; Hiromi Yuasa, Muko; both of Japan

[73] Assignee: Omron Tateisi Electronics Co., Kyoto, Japan

[21] Appl. No.: 242,147

[22] Filed: Mar. 9, 1981

[30] Foreign Application Priority Data

Mar. 26, 1980 [JP] Japan ................................. 55-39312

[51] Int. Cl.³ .............................................. G06F 15/02
[52] U.S. Cl. ..................................................... 364/900
[58] Field of Search ... 364/200 MS File, 900 MS File, 364/405, 406

[56] References Cited

U.S. PATENT DOCUMENTS

| 3,806,711 | 4/1974 | Cousins, Jr. | 364/405 |
| 4,138,733 | 2/1979 | Tadakoma et al. | 364/900 |
| 4,229,794 | 10/1980 | Foster | 364/466 |
| 4,245,311 | 1/1981 | Nakamura | 364/405 |
| 4,293,911 | 10/1981 | Oonishi | 364/405 |
| 4,312,037 | 1/1982 | Yamakita | 364/405 |
| 4,317,172 | 2/1982 | Nakano | 364/405 |
| 4,322,796 | 3/1982 | Uchida et al. | 364/405 |
| 4,360,872 | 11/1982 | Suzuki et al. | 364/405 |
| 4,389,707 | 6/1983 | Tsuzuki | 364/405 |
| 4,419,738 | 12/1983 | Takahashi et al. | 364/405 |

Primary Examiner—Gareth D. Shaw
Assistant Examiner—Tim A. Wiens
Attorney, Agent, or Firm—Staas & Halsey

[57] ABSTRACT

An electronic cash register comprises a memory having a plurality of registering regions each allotted for each of the commodity departments, and a keyboard including numeral keys, whereby any of the registering regions of the memory are set to be utilizable by means of the keyboard. If and when a series of the commodity department codes are consecutive, the first commodity department code and the last commodity department code are entered by the keyboard, while the restricted number of digits of the unit prices being registerable is also entered. The registering regions corresponding to the respective commodity department codes between the first commodity department code and the last commodity department code are in succession designated by an address counter, and the restricted number of digits of the unit prices is loaded in the designated registering regions, whereby the series of the consecutive registering regions are set to be utilizable.

11 Claims, 9 Drawing Figures

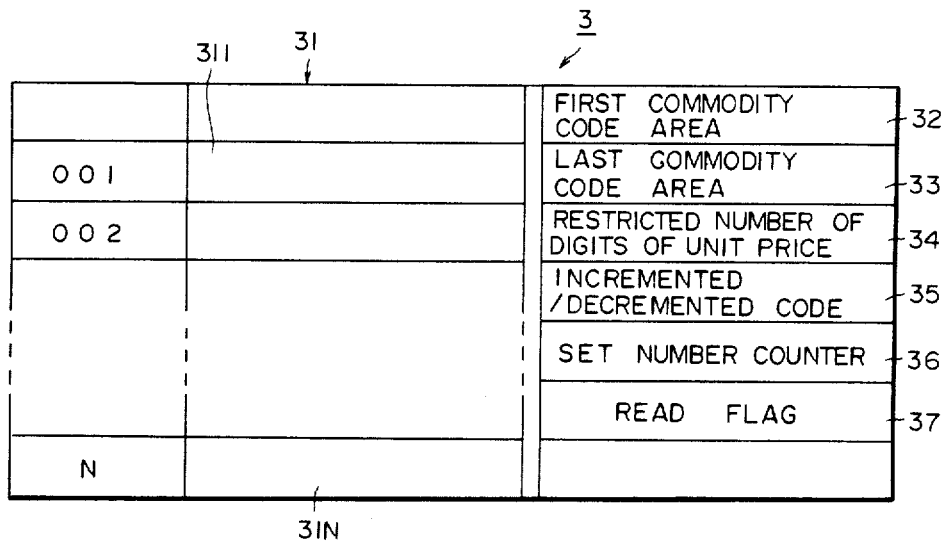

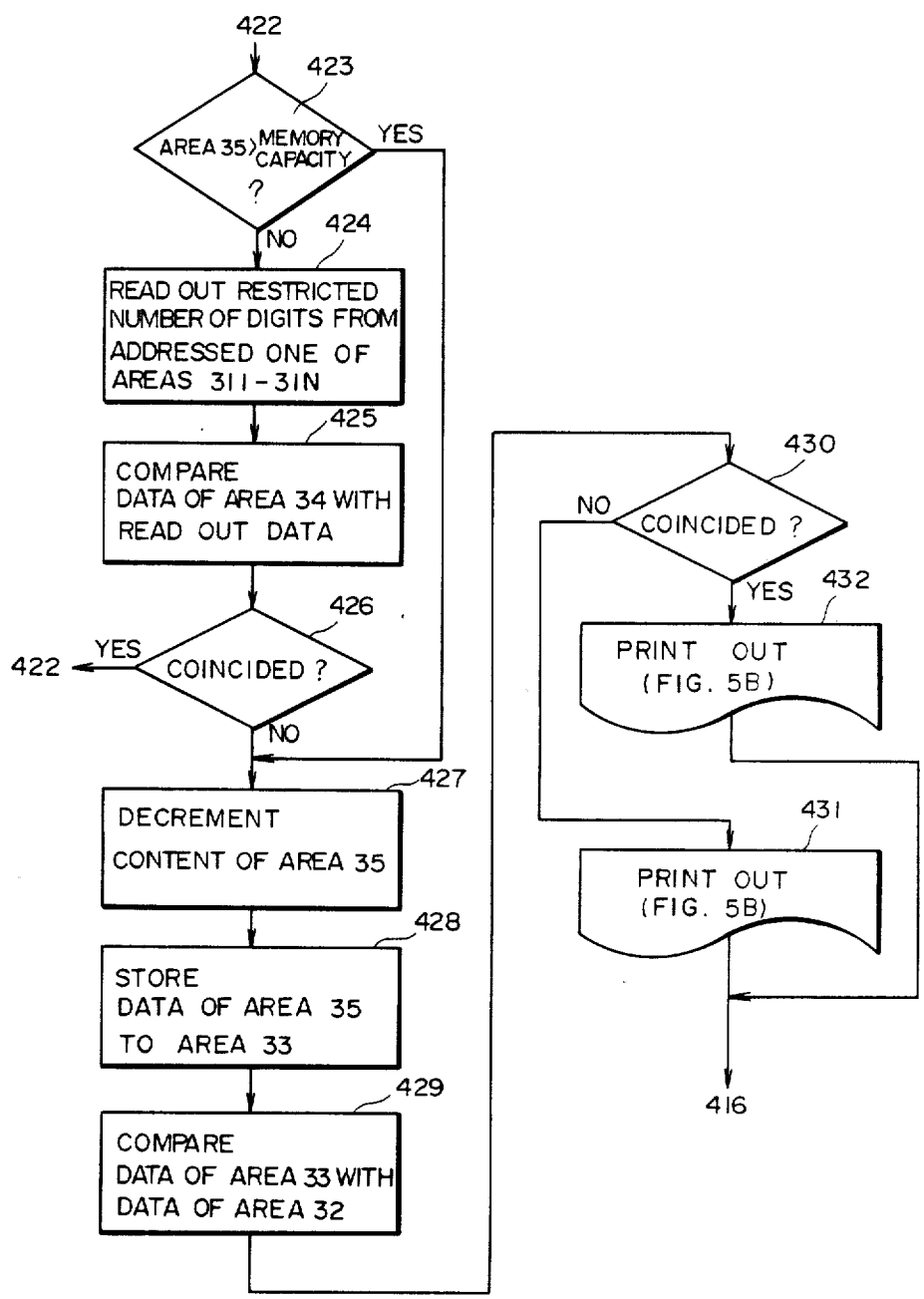

ELECTRONIC CASH REGISTER

BACKGROUND OF THE INVENTION

1. Field of the Invention

The present invention generally relates to an electronic cash register. More specifically, the present invention relates to a commodity department setting system for setting utilizable the registering regions associated with the respective commodity department codes in a memory for storing the registered data in an electronic cash register for making a registering operation by entering a commodity department code allotted in advance for each of the commodity departments as grouped and unit price data of each of the commodities.

2. Description of the Prior Art

Conventionally, an electronic cash register has been adapted to make a registering operation by entering a commodity department code allotted in advance for each of the commodities and unit price data of each of the commodities. Another type of electronic cash register having a function of restricting the number of digits of a unit price has also been put into practical use wherein the number of digits of the unit price data that can be entered is restricted in association with the unit price of each commodity and, when a numerical value of the digit number larger than that is entered by an operator, an error indication is made, thereby to prevent a mistake in operation by an operator.

Meanwhile, such an electronic cash register adapted for making a registering operation by entering the commodity department codes and the unit price data is structured to comprise a memory for storing the registered data so as to be capable of setting the commodity department codes of the respective commodities in the respective storing regions of the memory. Before entering into business, the commodity department codes are set in the respective storing regions of the memory by entering the commodity department codes from a keyboard. However, in the case of a supermarket, for example, the commodities are diversified and the number of commodity department codes could be sometimes more than 1000. In the case where the number of commodity department codes is very large, disadvantages are involved in that the operations for setting the respective commodity department codes in the memory are very tiresome and at the same time much labor and time are required.

SUMMARY OF THE INVENTION

Briefly described, the present invention is adapted such that, in the case where the commodity department codes being set to be utilizable are consecutive, the first commodity department code and the last commodity department code of the consecutive commodity department codes are entered, and the registering regions of a memory associated with the commodity departments corresponding to the consecutive commodity department codes from the first commodity department code to the last commodity department code are in succession designated, while specifying information is loaded in the designated registering regions, whereby a series of consecutive registering regions are set to be utilizable. Therefore, according to the present invention, even in the case where the number of commodity departments being set is large, setting of such commodity departments can be performed with extreme ease. Therefore, labor of an operator of an electronic cash register is drastically decreased.

In a preferred embodiment of the present invention the unit prices of the commodity departments corresponding to the registering regions are restricted by a predetermined number of digits of the unit prices, and when a unit price of the digit number larger than the restricted digit number is entered in the registering region, an error indication is made. To that end, the restricted number of digits is preset in each of the registering regions. The above described specifying information is achieved by using the restricted number of digits as such information. Therefore, according to the preferred embodiment, it is not necessary to separately set the restricted number of digits and the specifying information representing utilizability for registering, with the result that a burden to an operator of an electronic cash register is further mitigated. Meanwhile, in the case where the restricted number of digits is used as the specifying information, the same number of digits is set in a series of the consecutive registering regions.

In a preferred embodiment of the present invention, in order to let an operator confirm the registering regions set to be utilizable, i.e. the commodity departments, through operation of a specified key, the same is notified by means of a printer and/or a display. Therefore, according to a preferred embodiment, an operator can learn with a simple operation how many commodity departments have been already set to be utilizable, and the like.

Accordingly, a principal object of the present invention is to provide a commodity department setting system in an electronic cash register, wherein the utilizable commodity departments can be set with relative simplicity and with less labor, even in the case of a much increased number of commodity departments.

BRIEF DESCRIPTION OF THE DRAWINGS

FIG. 3 is a view diagrammatically showing the data stored in a random access memory included in FIG. 1;

FIGS. 5A and 5B are views diagrammatically showing the data printed by a printer in accordance with one embodiment of the present invention.

DESCRIPTION OF THE PREFERRED EMBODIMENTS

Figure 1:
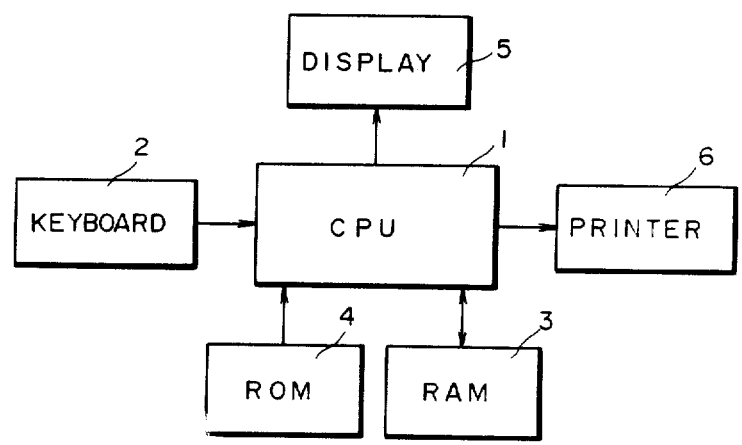
FIG. 1 is an outline block diagram of one embodiment of the present invention.

FIG. 1 is an outline block diagram of one embodiment of the present invention. The embodiment shown comprises a central processing unit 1 for making an arithmetic control, which makes an operation in accordance with a program stored in a read only memory 4. A keyboard 2 for entering commodity department codes and the unit price data, a random access memory 3 for storing the commodity department codes and the unit price data, a display 5 for displaying the commodity department codes, the unit price data and the like, and a printer 6 for printing the same are provided in association with the central processing unit 1.

Figure 2:
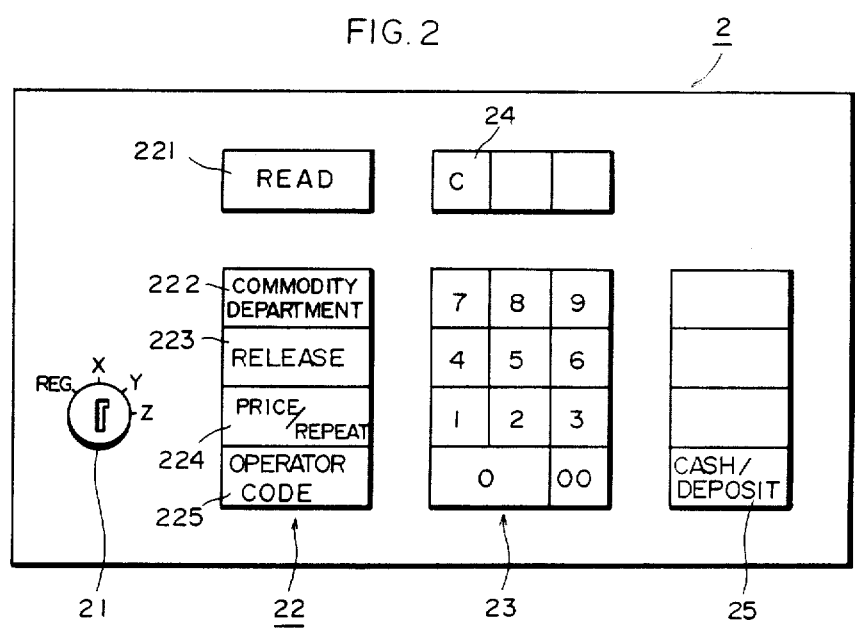
FIG. 2 is a view of a key arrangement of a keyboard included in FIG. 1.

FIG. 2 is a view showing an arrangement of keys in the keyboard 2 included in FIG. 1. A mode selecting switch 21 is provided for selecting a registering mode (REG) for registering data being registered of commodities, a setting mode (X) for setting commodity department codes, a check mode (Y) for checking registered data, and a liquidation mode (Z) for making liquidation. A function key 22 comprises a read key 221 for instructing a reading operation of the number of the commodity department codes set in the random access memory 3, a commodity department key 222 being operated when specifying a commodity department code, a digit number restriction releasing key 223 for releasing a function of restricting the number of digits of the unit price in the case where the unit price data of the digit number larger than the restricted number of digits of the unit price is entered, a price/repeat key 224 being operated when specifying that the unit price data is entered and when making a repetitive registering operation, and a code key 225 being operated when setting an operator code. Numeral keys 23 are used for entering commodity department codes and the unit price data and a clear key 24 having an indication "C" is used for clearing a numerical value when the same is erroneously entered by the numeral keys 23. A cash/deposit key 25 is further provided for instructing an arithmetic operation when entry of the data of all the commodities is completed. In the case where the mode selecting switch 21 is selected to the setting mode (X), the digit number restriction releasing key 223 serves as entry means for specifying the first code and similarly the code key 225 also serves as a key for specifying the last code.

FIG. 3 is a view diagrammatically showing the data stored in the random access memory 3 included in FIG. 1. Referring to FIG. 3, the random access memory 3 comprises areas 31 to 37. The area 31 comprises areas 311 to 31N for storing the restricted number of digits of the unit price corresponding to the respective ones of the addresses "001" to "N". The numbers of the respective addresses "001" to "N" are allotted as commodity department codes and only the areas having the restricted number of digits of the unit price set out of these areas are adapted to be capable of registering the data. Meanwhile, an area for storing the unit price data and the number of registrations for each of the commodity departments is provided corresponding to each of the addresses "001" to "N", although not shown. The area 32 is allotted for storing the first code out of the consecutive commodity department codes, thereby to implement a first code storing means. The area 33 is allotted for storing the last code of the consecutive commodity department codes, thereby to implement a last code storing means. The area 34 is used to store the data of the restricted number of digits of the unit price entered from the numeral keys 23 when setting the restricted number of digits of the unit price in the respective ones of the area 31. The area 35 is used to store a code having the numerical value incremented/decremented in succession between the first code of the area 32 and the last code of the area 33. The area 36 is used to count the restricted numbers of digits of the unit price set in the area 31. The area 37 is used to store a read flag being set when the read key 221 is operated.

Figure 4A:
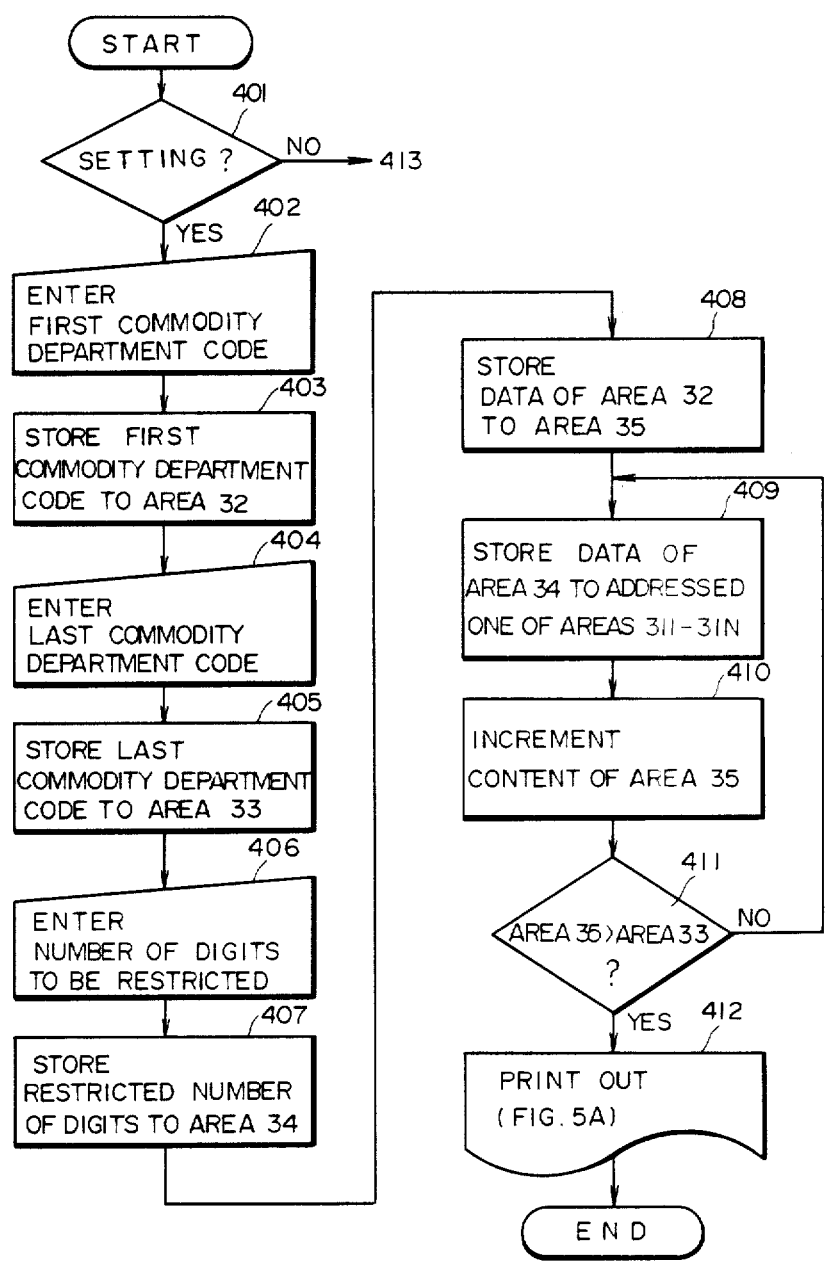
FIG. 4 is a flow diagram for depicting an operation of one embodiment of the present invention.
Figure 4B:
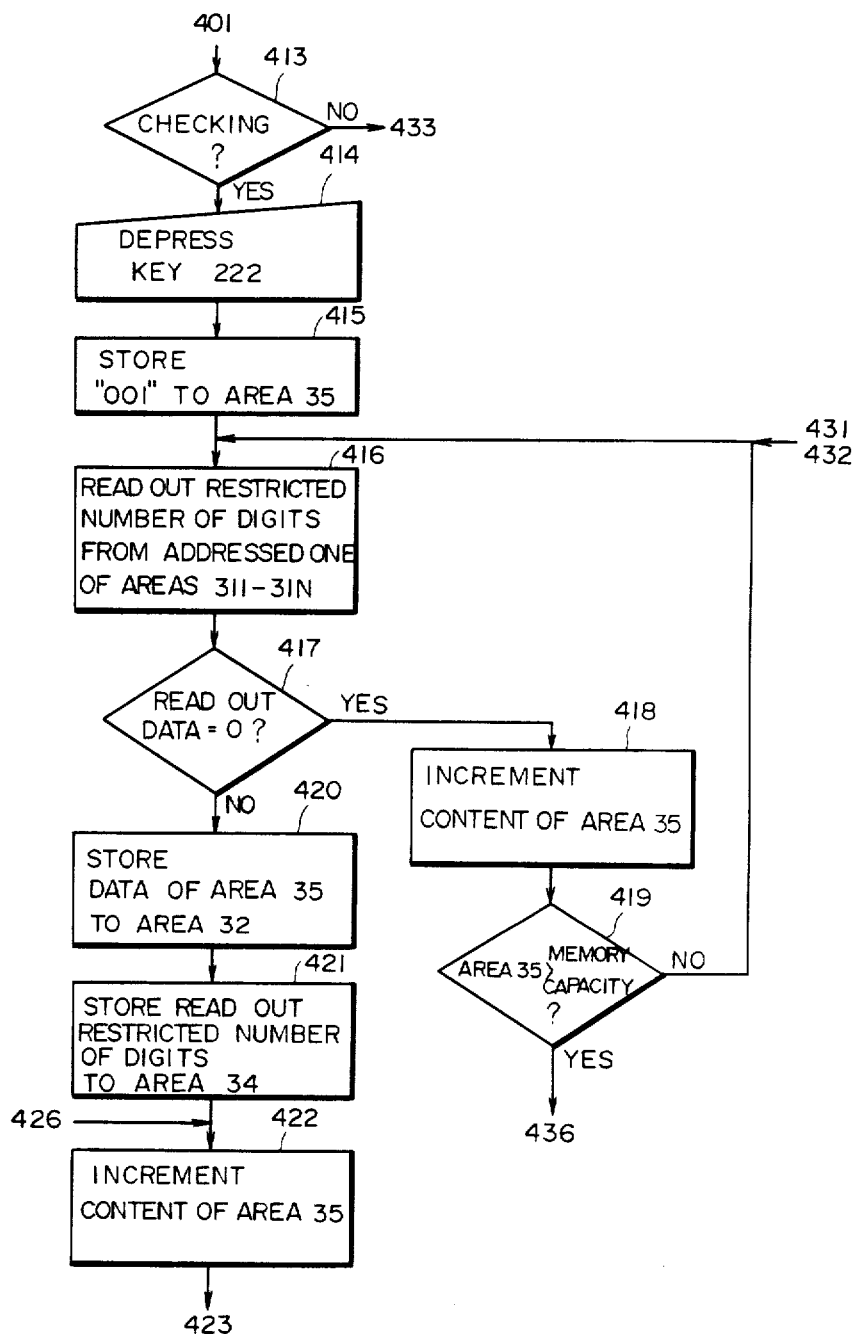
Figure 4D:
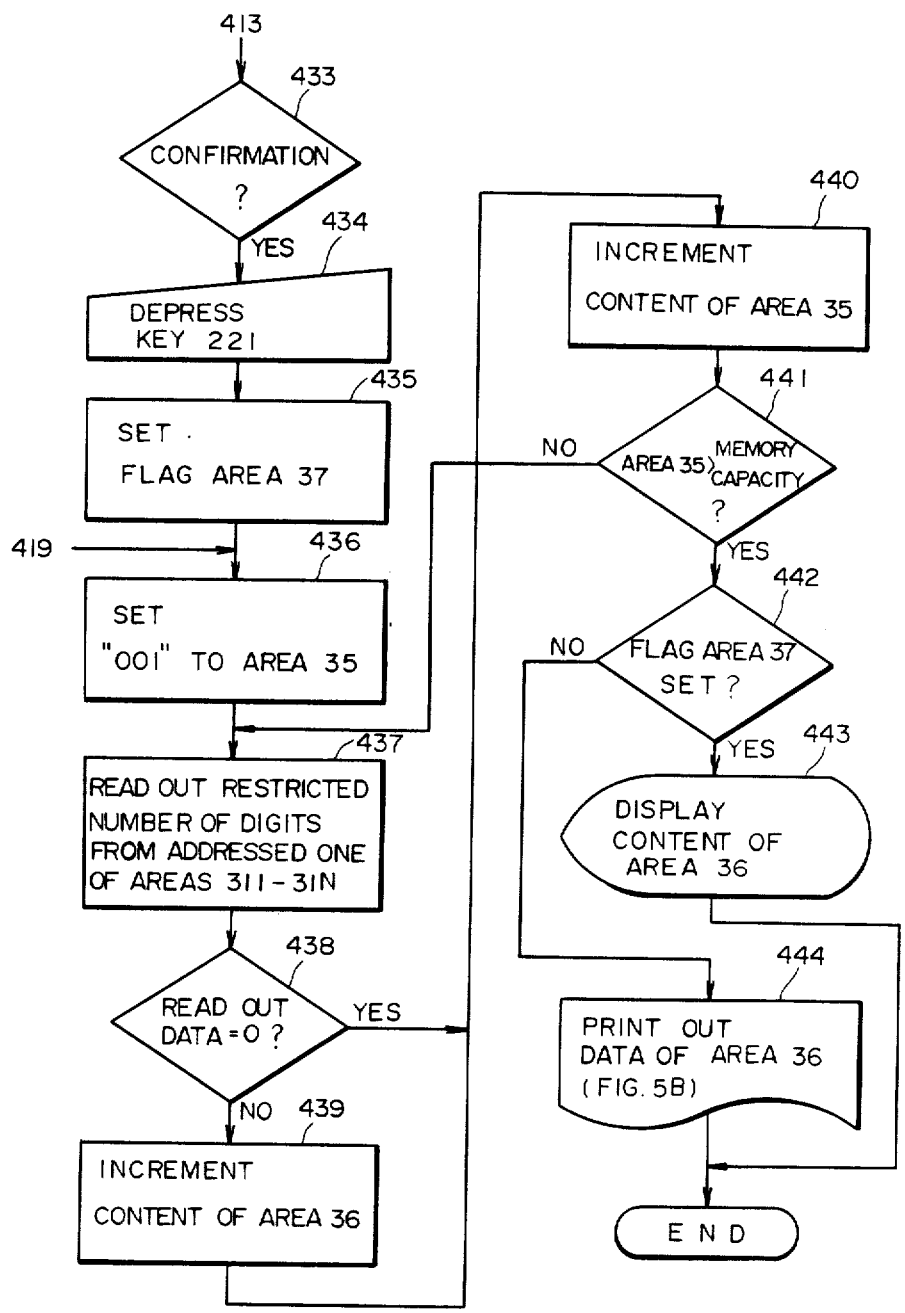

FIG. 4 is a flow diagram for depicting a specific operation of one embodiment of the present invention and FIGS. 5A and 5B are views diagrammatically showing the data being printed by a printer in accordance with one embodiment of the present invention, wherein FIG. 5A shows a print out of the set content and FIG. 5B shows a print out of the set content upon checking.

Now referring to FIGS. 1 to 5, a specific operation of one embodiment of the present invention will be described. First an operation in the case where the commodity department codes are set will be described. In the case where an operator sets the commodity department codes, the mode selecting switch 21 is selected at the step 401 to the setting mode (X position). Let it be assumed that by way of one example the commodity department codes "101" to "155" are set to be registrable in the addresses "101" to "155" (not shown) of the area 31 of the random access memory 3 by making the addresses "101" to "155" utilizable and the number of digits of the unit price data that can be registered in the respective addresses "101" to "155" is four digits. An operator first enters at the step 402 the first code "101" using the numeral keys 23 and operates the digit number restriction releasing key 223 for the purpose of specifying that the numerical value entered from the numerical keys 23 is the first code. Accordingly the central processing unit 1 stores at the step 403 the entered first code "101" in the area 32 of the random access memory 3. Then the operator enters at the step 404 the last commodity department code "155" using the numeral keys 23 and operates the code key 225 for the purpose of specifying that the numerical value is the last code. Accordingly the central processing unit 1 stores at the step 405 the last code in the area 33. The operator further enters the restricted number of digits of the unit price of the commodity departments "101" to "155", say "4" using the numerical value key 23, and then operates the price/repeat key 224 for the purpose of specifying that the numerical value is the restricted number of digits of the unit price. Accordingly, the central processing unit 1 stores at the step 407 the restricted number of digits of the unit price "4" in the area 34.

The central processing unit 1 then stores at the step 408 the first code of the area 32 in the area 35, thereby to adopt the first code "101" as an initial incremented/decremented code. Then the restricted number of digits of the unit price "4" stored in the area 34 is stored at the step 409 in the address "101" of the area 31 designated by the incremented/decremented code stored in the area 35. Thereafter the central processing unit 1 increments at the step 410 the code of the area 35 to increase the incremented/decremented code to "102". The central processing unit 1 determines at the step 411 whether the new incremented code "102" has exceeded the last code "155" of the area 33 and returns to the previous step 409 and stores the restricted number of digits of unit price in the address of the area 31 designated by the incremented code "102" of the area 31, if the last code has not been exceeded. Then at the step 410 one is added to the incremented/decremented code again and it is determined whether the new incremented code has exceeded the last code. Thereafter the above described operation is repeated until the new incremented code comes to coincide with the last code "155". If and when the new incremented code coincides with the last code "155", then as shown in FIG. 5A, at the step 412 the restricted number of digits of unit price "4" as set in the registering areas corresponding to from the first code "101" to the last code "155" is printed on a receipt. Through the above described series of operations the restricted number of digits of the unit price "4" is set in the respective registering areas, such as in the addresses "101" to "155" of the area 31 and then it is adopted such that the data becomes registrable in the areas wherein the restricted number of digits of unit price is set. The addresses "101" to "155" are used as commodity department codes.

In the case where the commodity department codes "170" to "199" are to be set following the setting of the commodity department codes "101" to "155", the first code "170" is entered and then the last code "199" is entered. Finally the restricted number of digits of the unit price, say "5" is entered, whereby the central processing unit 1 stores the restricted number of digits of the unit price "5" in the addresses "170" to "199" of the area 31. In the case where a single commodity department code, say "853" is to be set, "853" is entered as the first code and similarly "853" is entered as the last code, whereupon the restricted number of digits of the unit price "6" is entered. In such a case, since the first code and the last code coincide with each other, at the step 411 for determining whether the incremented/decremented code has exceeded the last code it is immediately determined that the incremented/decremented code has coincided with the last code, whereupon the set content is printed at the step 412.

Then an operation in the case where the respective commodity department codes have been properly set in the random access memory 3 will be described. First an operator selects the mode selecting switch 21 to the check mode (Y) and then depresses the commodity department key 222 at the steps 413 and 414. Accordingly the central processing unit 1 stores at the step 415 the numerical value "001" in the area 35 as an initial incremented/decremented code. Then at the step 416 the restricted number of digits of the unit price is read from the area designated by the incremented/decremented code "001" of the area 31. It is determined at the step 417 whether the restricted number of digits of the unit price is "0", i.e. the restricted number of digits of unit price has been set. In such a case, since no restricted number of digits of the unit price has been set in the address "001" of the area 31, the program proceeds to the step 418 and one is added to the incremented/decremented code "001" to become "002". Then at the step 419 it is determined whether the incremented/decremented code "002" has exceeded the maximum address, i.e. the memory capacity, of the storing region of the area 31. In this case it is assumed that the maximum address (N in FIG. 3) of the storing regions of the area 31 is "1000". Unless the incremented/decremented code "002" has exceeded the maximum value, the program returns to the step 416 and the content in the address "002" of the area 31 designated by the incremented/decremented code "002" is read out.

After the above described operation is repeated and the restricted number of digits of the unit price is read out from the address "101" of the area 31 when the incremented/decremented code becomes "101", it is determined in this case that the restricted number of digits of the unit price is not "0", whereupon at the step 420 the incremented/decremented code "101" is stored in the area 32 as the first code. Then the restricted number of digits of the unit price is read out from the area 311 designated by the incremented/decremented code "101" and at the step 421 the restricted number of digits of the unit price is stored in the area 34. Then at the step 422 one is added to the incremented/decremented code "101" so that "102" is attained. Then at the step 423 it is determined whether the incremented/decremented code "102" has exceeded the maximum value and, if the maximum value is not exceeded, at the step 424 the restricted number of digits of the unit price is read out from the area 31 designated by the incremented/decremented code "102". Then at the following steps 425 and 426 the restricted number of digits of the unit price as read out and the restricted number of digits of the unit price as stored in the area 34 are compared to determine coincidence. If coincidence is determined, then it is interpreted as the commodity department codes being consecutive, whereupon the program returns to the step 422 and one is added to the incremented/decremented code "102" to become "103". When the above described operation is repeated and the restricted number of digits of the unit price comes not to be read out from the incremented/decremented code "156", it is determined that the restricted number of digits of the unit price of the incremented/decremented code "155" does not coincide with the restricted number of digits of the unit price of the incremented/decremented code "156", whereupon at the step 427 one is subtracted from the incremented/decremented code "156" to become "155". Then at the step 428 the above described incremented/decremented code "155" is stored in the area 33 as the last code. The first code "101" of the area 32 is compared with the last code "155" of the area 33 to determine coincidence at the steps 429 and 430. In the presence of coincidence, at the step 432 the commodity department code and the restricted number of digits of the unit price corresponding to the commodity department code are printed out as shown in FIG. 5B. In the absence of coincidence, at the step 431 the first code "101", the last code "155" and the restricted number of digits of the unit price "4" stored in the respective areas are printed on a receipt, as shown in FIG. 5B.

Then the restricted number of digits of the unit price is again read out from the address designated by the incremented/decremented code of the area 35, whereupon the same operation as described above is performed.

Now an operation in the case where for the purpose of confirmation the set number is to be read from the area 31 in which the restricted number of digits of the unit price is set will be described. In such a case, first at the step 434 an operator turns the mode selecting switch 21 to the check mode state (Y), whereupon he depresses the read key 221. Meanwhile, the check mode is selected in the case where it is desired to know the numerical value as set in the course of setting the above described restricted number of digits of the unit price, in the case where it is desired to confirm the set numbers after the setting is completed, and the like. At the step 435 the central processing unit 1 is responsive to operation of the read key 221 to set the read flag in the area 37. Then at the step 436 the first code "001" is set in the area 35 as the incremented/decremented code. At the step 437 the content as stored is read out from the address of the area 31 designated by the incremented/decremented code "001". If and when the data read at the determining step 438 is determined as the restricted number of digits of the unit price, then at the step 439 the set number counter of the area 36 is stepped up, while at the step 440 one is added to the incremented/decremented code. In the case where it is determined at the determining step 438 that no restricted number of digits of the unit price has been set in the address "001", immediately the program returns to the step 440 and one is added to the incremented/decremented code. Then the above described operation is repeated until the incremented/decremented code exceeds the maximum value. If and when it is determined at the step 421 that the incremented/decremented code becomes the maximum value, it is determined at the following step 442 whether the read flag of the area 37 has been set. If the read flag has been set, at the step 443 the count value as counted by the set number counter of the area 36, i.e. the number of the areas in which the restricted number of digits of the unit price has been set is displayed by the display 5. Unless the read flag has been set, at the step 444 the number of the set restricted numbers of digits of the unit price, i.e. "437" is printed, as shown in FIG. 5B.

As described in the foregoing, in specifying the commodity department code by setting the restricted number of digits of the unit price in each of the respective addresses of the area 31, if and when the read key is operated midway then the set number so far set can be displayed by the display 5, with the resultant advantage that the number of commodity departments as set can be readily known.

Meanwhile, although the foregoing embodiment was described as utilizing the restricted number of digits of the unit price as the specifying information, alternatively such information may be mere flag information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic cash register, comprising:
    memory means having a plurality of registering regions, each registering region allotted for a commodity department,
    each said registering region including a specifying information storing portion, each said specifying information storing portion representing that, when specifying information is loaded therein, the corresponding registering region is capable of registering information,
    each said commodity department being allotted a corresponding commodity department code for individually identifying the same,
    entry means for entering a first commodity department code and a last commodity department code of a series of consecutive commodity department codes, the series being greater than two in number, in case where said series of consecutive commodity department codes are allotted for a plurality of commodity departments which need be made registrable,
    first code storing means for storing said first commodity department code entered by said entry means,
    second code storing means for storing said last commodity department code entered by said entry means,
    region designating means responsive to said commodity department codes stored in said first and second code storing means for designating in succession said registering regions associated with the commodity departments corresponding to the respective consecutive commodity department codes from said first commodity department code to said last commodity department code,
    write enabling means for enabling writing of said specifying information in said specifying information storing portion, and
    writing means responsive to enabling by said write enabling means for writing said specifying information in said specifying information storing portion of said registering region designated by said region designating means, whereby when an operator wishes to register new or change or output information stored in the registering regions corresponding to the series, the operator only needs to enter the first and last commodity department codes to designate which registering regions are to be accessed.

2. An electronic cash register in accordance with claim 1, wherein
    said region designating means comprises
        counter means for counting, and
        count controlling means for providing an increment or decrement signal to said counter means,
    the count value in said counter means designating said registering regions.

3. An electronic cash register in accordance with claim 2, wherein
    each said registering region being allotted said corresponding commodity department code,
    said count controlling means including signal providing means for providing an increment signal for incrementing said counter means from said first commodity department code by a predetermined number or for providing a decrement signal for decrementing said counter means from said last commodity department code by a predetermined number.

4. An electronic cash register in accordance with claim 1, wherein
    each said registering region comprises a digit number storing region for storing a restricted number of digits of a unit price being registerable in said storing region,
    said specifying information comprises said restricted number of digits, and
    said write enabling means comprises digit number entry means for entering said restricted number of digits.

5. An electronic cash register in accordance with claim 4, wherein said registering regions are consecutively in series and
    said writing means is adapted to write the same restricted number of digits from said digit number entry means in said series of consecutive registering regions corresponding to the respective commodity departments of said series of consecutive commodity department codes.

6. An electronic cash register in accordance with claim 1, wherein
    each said registering region includes a flag region,
    said specifying information includes flag information being loaded in said flag region, and
    said write enabling means includes flag information providing means for providing said flag information.

7. An electronic cash register in accordance with claim 1, 2, 3, 4, 5, or 6, which further comprises
    reading means for reading information from said registering region wherein said specifying information is stored, and
    output means for outputting said information read from said reading means.

8. An electronic cash register, comprising:

memory means having a plurality of registering regions, each registering region allotted for a commodity department, each said registering region including a specifying information storing portion, each said specifying information storing portion representing that, when specifying information is loaded therein, the corresponding registering region is capable of registering information, each said commodity department being allotted a corresponding commodity department code for individually identifying the same, entry means for entering a first commodity department code and a last commodity department code of a series of consecutive commodity department codes, in the case where said series of consecutive commodity department codes are allotted for a plurality of commodity departments which need be made registrable, first code storing means for storing said first commodity department code entered by said entry means, second code storing means for storing said last commodity department code entered by said entry means, region designating means responsive to said commodity department codes stored in said first and second code storing means for designating in succession said registering regions associated with the commodity departments corresponding to the respective consecutive commodity department codes from said first commodity department code to said last commodity department code, write enabling means for enabling writing of said specifying information in said specifying information storing portion, writing means responsive to enabling by said write enabling means for writing said specifying information in said specifying information storing portion of said registering region designated by said region designating means, reading means for reading information from said registering region wherein said specifying information is stored, said reading means comprising read enabling means for enabling reading, and in-succession designating means responsive to said read enabling means for designating in succession said registering regions of said storage means where said specifying information is stored, and output means for outputting said information read from said reading means, whereby when an operator wishes to register new or change or output information stored in the registering regions corresponding to the series, the operator only needs to enter the first and last commodity department codes to designate which registering regions are to be accessed.

9. An electronic cash register in accordance with claim 8, wherein
said outputting means comprises printer means for printing.

10. An electronic cash register in accordance with claim 9, wherein
said printer means is adapted to print out said first commodity department code and said last commodity department code as well as said specifying information with respect to said consecutive commodity department codes.

11. An electronic cash register in accordance with claim 10, wherein
said printer is adapted to individually print out the commodity departments corresponding to the commodity department code not included in said consecutive commodity department codes.

* * * * *